US006067180A

United States Patent [19]
Roberts

[11] Patent Number: 6,067,180
[45] Date of Patent: May 23, 2000

[54] EQUALIZATION, PULSE SHAPING AND REGENERATION OF OPTICAL SIGNALS

[75] Inventor: Kim Byron Roberts, Welwyn Garden City, United Kingdom

[73] Assignee: Nortel Networks Corporation, Montreal, Canada

[21] Appl. No.: 08/892,708

[22] Filed: Jul. 15, 1997

[30] Foreign Application Priority Data

Jun. 9, 1997 [GB] United Kingdom .................. 9712020

[51] Int. Cl.[7] .................................................. H04B 10/04
[52] U.S. Cl. .......................... 359/181; 359/188; 359/140
[58] Field of Search .................................. 359/139, 161, 359/173, 180, 181, 188, 140

[56] References Cited

U.S. PATENT DOCUMENTS

| | | | |
|---|---|---|---|
| 4,262,992 | 4/1981 | Berthold, III | 350/96.14 |
| 4,997,249 | 3/1991 | Berry et al. | 359/139 |
| 5,408,500 | 4/1995 | Ginzburg et al. | 375/288 |
| 5,428,697 | 6/1995 | Dolfi et al. | 385/24 |
| 5,473,457 | 12/1995 | Ono | 359/161 |
| 5,798,852 | 8/1998 | Billes et al. | 359/158 |
| 5,900,956 | 5/1999 | Cotter | 359/139 |

FOREIGN PATENT DOCUMENTS 2302225  1/1997  United Kingdom .

OTHER PUBLICATIONS

IEEE Phototonics Technology Letters, vol. 7, No. 11, Nov. 1995 "Optimal Conditions for High–Speed All–Optical SOA–Based Wavelength Shifting", W. Shieh and A. E. Willner.

IEEE Phototonics Technology Letters, vol. 8, No. 9, Sep. 1996 "10Gb/s Wavelength Conversion with Integrated Multiquantum–Well–Based 3–Port Mach–Zehnder Interferometer", W. Idler, K. Daub, G. Laube et al.

Journal of Lightwave Technology, vol. 10, No. 8, Aug. 1992, "Performance of Smart Lightwave Receivers with Linear Equalization", John C. Cartledge, Ross G. Mckay and Mark C. Nowell.

*Primary Examiner*—Leslie Pascal
*Attorney, Agent, or Firm*—Lee, Mann, Smith, McWilliams, Sweeney & Ohlson

[57] ABSTRACT

Data carrying optical signals are subjected to equalization or pulse shaping of the optical signal waveform. A plurality of optical tap signals derived from the optical signal are used to control a modulator operating on an input signal to provide an output signal having the desired waveform. A Mach-Zehnder interferometer having semiconductor optical amplifiers in each arm provides modulation by the effect of cross modulation induced by propagating the respective tap signals through a selected one of the semiconductor optical amplifiers. Various forms of transversal filter are provided by selecting the number of optical taps, assigning positive or negative weights and appropriate delays. The effects of dispersion in optical signals can be mitigated by utilizing optical taps with negative weights to subtract tail portions from the leading and trailing edges of a signal pulse. The invention has application to systems with high bit rates where equalization or pulse shaping in the electrical domain is difficult to implement.

42 Claims, 7 Drawing Sheets

OPTICAL TRANSVERSAL FILTER WITH SUBTRACTION

Fig 1
OPTICAL TRANSVERSAL FILTER WITH SUBTRACTION

Fig 2   OPTICAL TRANSVERSAL FILTER WITH ADDITION

Fig3

THREE TAP DISPERSION EQUALIZER

Fig 4    CROSS PHASE MODULATION COMPENSATION

EQUALIZATION, PULSE SHAPING AND REGENERATION OF OPTICAL SIGNALS

FIELD OF THE INVENTION

This invention relates to the processing of optical signals including equalisation, pulse shaping and regeneration of optical signals and in particular but, not exclusively, to the processing of such optical signals in a telecommunication's network.

BACKGROUND TO THE INVENTION

The transmission of optical signals in optical networks at bit rates in excess of 1 GHz, particularly over long distances, is susceptible to a number of sources of degradation to the optical signal. The present invention is concerned with correcting such degradation when it can be effected by applying equalisation to modify the amplitude waveform of an optical pulse and also to improvements in modulation for the purpose of regeneration.

It is known to provide detection of the waveform of an optical signal such as a pulse amplitude modulated optical signal and to subsequently apply equalisation to the resulting electrical waveform in order to cancel the effects of distortion by, for example, restoring symmetry. Such equalisation however becomes increasingly difficult with increasing bit rates and has the disadvantage that noise is added during the conversion to electrical signal with the result that the equalisation process may magnify such added noise. It would therefore be desirable to be able to effect equalisation in the optical domain. It is however difficult to implement such equalisation by known methods, a particular difficulty being that known techniques rely upon matching the operating wavelength of an optical filter to the carrier frequency of the optical signal. Fluctuation in the wavelength of the optical signal requires wavelength tracking or wavelength locking for stability. An etalon may, for example, be utilised to provide a narrow optical filter in such a process.

It is also known to provide a transversal filter in the optical domain comprising a branch, differential delay and recombining element. A further difficulty is that the optical signal generally has a finite line width which may cause multipath interference effects which degrade the optical signal during the filtering process. It has hitherto however not been possible to effect transversal filters in which negative weights are applied, ie. in which components of the optical signal are subtractively combined.

It is known from Idler et al (IEEE Photonics Technology Letters, Vol. 8, No. 9, Sep. 1996-"10 Gb/s Wavelength Conversion with Integrated Multiquantum-Well-Based 3-Port Mach-Zehnder Interferometer") to provide inversion of a single optical signal in addition to wavelength conversion by means of a Mach-Zehnder interferometer in which semiconductor optical amplifiers are utilised to set an interference condition between optical components of an input signal transmitted through first and second arms of the interferometer. A continuous wave optical signal propagated equally through the first and second arms is recombined to form an output signal which is modulated according to the interference condition and a pulsed optical signal is counterpropagated through only one of the arms so as to modulate the phase of one of the component signals by cross-phase modulation due to the non-linear characteristics of the semiconductor optical amplifier in that arm.

SUMMARY OF THE INVENTION

It is an object of the present invention to provide equalisation and pulse shaping of optical signals in the optical domain.

It is a further objective of the present invention to provide an optical transversal filter in which positive and/or negative weights may be applied.

It is a further object of the present invention to provide an improved method of regeneration of optical signals.

According to one aspect of the present invention there is disclosed a method of processing an optical signal having an intensity which is time varying in amplitude to define an optical signal waveform, the method comprising the steps of:

forming a plurality of optical tap signals from the optical signal such that the tap signals define respective tap signal waveforms representative of the optical signal waveform subjected to different respective delay periods;

inputting the tap signals as controlling signals to a modulating means;

inputting an optical input signal to the modulating means to be modulated thereby;

and controlling the modulating means in response to the input of the tap signals such that the modulating means provides modulation of the input signal to provide an optical output signal defining an output waveform modulated in dependence upon a combination of the amplitudes of the tap signal waveforms.

An advantage of such a method is to provide amplitude modulation of the output waveform in a manner which is sensitive to the amplitude of the optical signal waveform and insensitive to the characteristic of the optical carrier signal of the optical signal.

By arranging for one or more selected tap signals to have an effect on the modulating means which is opposite to the effect of the remaining tap signals, the cumulative effect of the tap signals may be such as to include an effect equivalent to subtraction of one tap signal from another.

Transversal filters in various forms are thereby achieved, including those which require negative weights derived from the above mentioned subtraction.

The modulating means may modulate a continuous wave input signal or a pulsed input signal resulting in sampling or regeneration of the optical signal in combination with the effect of the transversal filter.

Preferably the modulating means is a Mach-Zehnder interferometer including semiconductor optical amplifiers, modulation being effected by determining an interference condition at the output of the interferometer, and determining the interference condition by propagating each of the tap signals through a respective single one of the semiconductor optical amplifiers to vary the interference condition by cross modulation.

Each of the tap signals may be generated via a respective optical tap waveguide having means for applying a respective weight (i.e. a multiplication factor) and a respective delay period. The weights and delaying periods may be provided by the use of appropriate attenuators and delay devices.

Preferred embodiments of the present invention will now be disclosed by way of example only and with reference to the accompanying drawings.

DETAILED DESCRIPTION OF EMBODIMENTS

Figure 6:
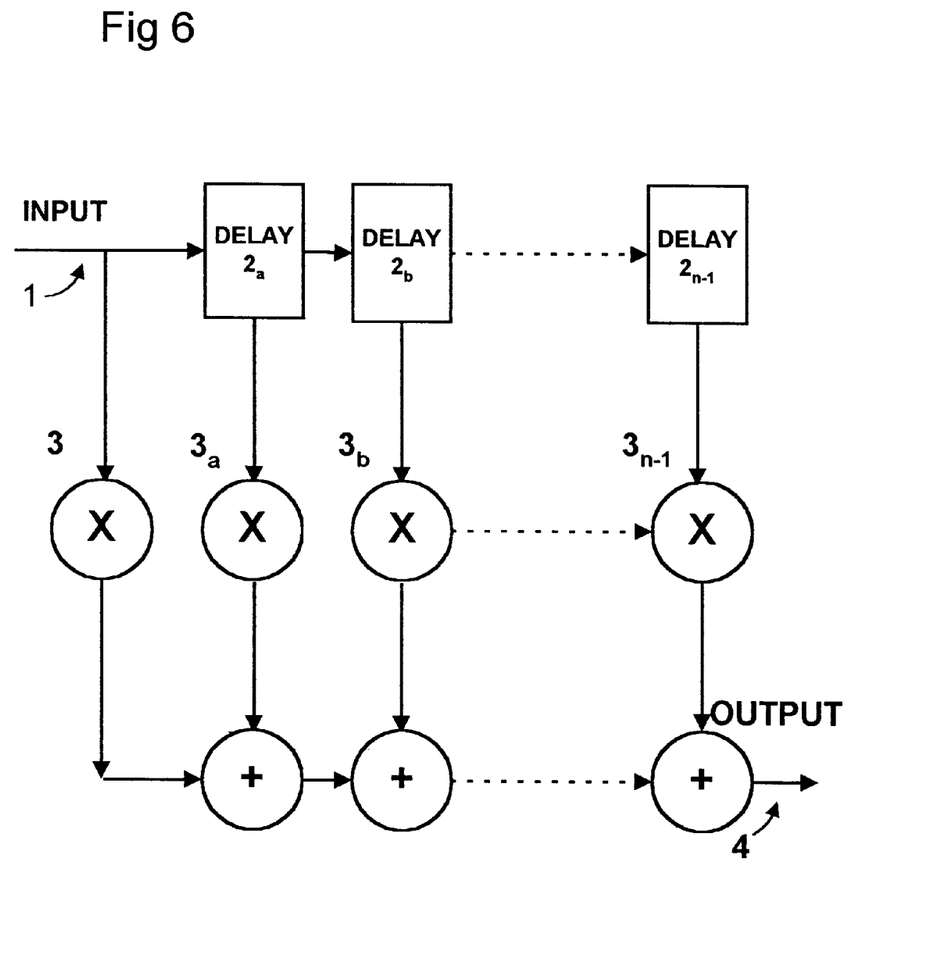
FIG. 6 is a generalised representation of a transversal equaliser for either the electrical or optical domain.

FIG. 6 illustrates a generalised transversal equaliser, otherwise known as a transversal filter, and has application to both the electrical and optical domains. An input signal 1 is subjected to a number of delays effected by delay units $2_a$, ... $2_{n-1}$ and samples of the input signal for each value of delay are subjected to multiplication by weights 3, $3_a$, ... $3_{n-1}$ which may be positive or negative, before summing the weighted components to form an output 4. In its simplest form, the transversal equaliser has a single delay and two taps and in its general form has n taps with n–1 delay units and n weights. Transversal equalisers may be tailored to specific applications by choice of the delay period, the number of taps, and the values of the weights. The weights may be preset or may alternatively be controlled to provide an adaptive equaliser.

Figure 1:
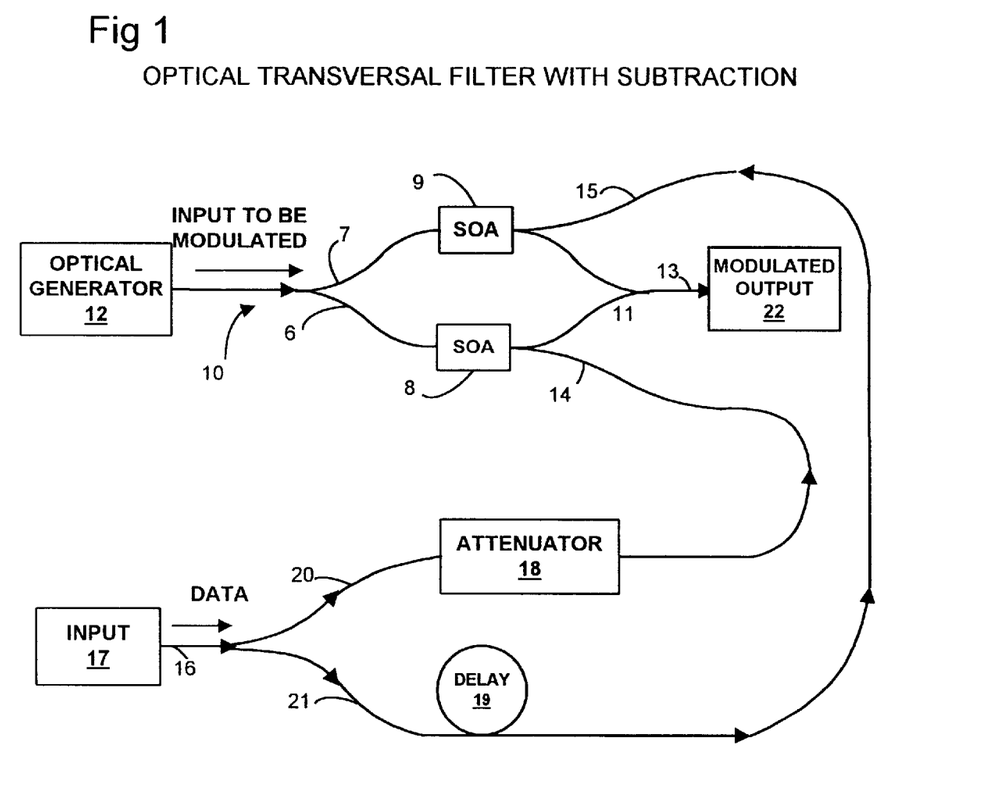
FIG. 1 is a schematic diagram of an optical transverse filter having two taps of which the second tap has a negative weight.

An optical transversal filter in accordance with the present invention is illustrated in FIG. 1 in which components are connected by lines representing waveguides. The transversal filter of FIG. 1 comprises a Mach-Zehnder interferometer 5 having first and second arms 6 and 7 comprising respective first and second semiconductor optical amplifiers 8 and 9 and extending between an optical waveguide splitter 10 and a waveguide combiner 11.

An optical generator 12 provides an input signal which is propagated via the waveguide splitter 10 so as to traverse the first and second arms 6 and 7 and recombine at an output waveguide 13 with an amplitude determined in accordance with an interference condition established in the interferometer 5, maximum output being obtained for constructive interference and a null output being obtained for destructive interference. The interferometer 5 thereby acts as a modulation means providing modulation of the input signal in dependence upon the interference condition.

A first optical tap waveguide 14 is coupled to the first arm 6 so as to inject a first optical tap signal to be counterpropagated relative to the generator input signal in the first arm. Cross phase modulation occurring in the first semiconductor amplifier 8 in the presence of both the first optical tap signal and generator input signal results in variation of the interference condition observed at the output waveguide 13 to an extent dependent upon the amplitude of the first optical tap signal injected via by the first tap waveguide 14. Similarly a second optical tap waveguide 15 is connected to the second arm 7 to couple a further optical tap signal to be counter-propagated in the second arm, the second tap signal similarly having a determining effect on the interference condition due to cross phase modulation in the second semiconductor optical amplifier 9.

The first and second semiconductor optical amplifiers 8 and 9 are biased such that, in the absence of counterpropagated optical tap signals, the components of the generator input signal recombined in the output waveguide 13 are equal in amplitude and opposite in phase to thereby provide a null output. The effect of cross phase modulation in the first semiconductor optical amplifier 8, for example, in the presence of a first optical tap signal via the first tap waveguide 14 is to vary the phase of the first component of the generator input signal recombining at the output waveguide 13, thereby changing the interference condition such that constructive interference occurs to a degree determined according to the amplitude of the optical signal. A corresponding effect occurs in the second semiconductor optical amplifier 9 such that, for example, if equal optical tap signals are input via the first and second tap waveguides 14 and 15, the respective effects on the interference condition are equal and opposite, thereby maintaining a null output with destructive interference. If, however, the second tap waveguide 15 receives a second tap signal of greater amplitude than the first tap signal, the effect on the interference condition will be determined according to the difference in amplitudes between the respective tap signals.

In the transversal filter of FIG. 1, a data carrying optical signal 16 from an input 17 is coupled equally into the first and second tap waveguides 14 and 15. An attenuator 18 is connected in line with the first tap waveguide 14 and a delay device 19 is connected in line with the second tap waveguide 15.

A first component 20 of the optical signal is therefore attenuated before being input as the first tap signal to the first semiconductor optical amplifier 8 and a second component 21 of the optical signal is delayed before being input as the second tap signal to the second conductor optical amplifier 9. By analogy with the transversal filter of FIG. 6, the optical transversal filter of FIG. 1 therefore corresponds to a two tap transversal filter in which delay device 19 corresponds to delay unit $2a$ and attenuator 18 corresponds to the weight function 3. Since the interference condition depends upon the difference upon the first and second tap signals, and since the first tap signal is attenuated, the input of the second tap signal to the second optical amplifier 9 can be regarded as assigning a positive weight and the input of the first tap signal to the first amplifier can be regarded as assigning a negative weight since the effect of this will be subtracted from that of the second tap signal.

In the example of FIG. 1, the attenuator 18 provides attenuation of 6 dB and the delay device 19 provides a delay of 1 bit period. This has the effect of regenerating the optical signal 16 delayed by 1 bit period with a leading edge of each pulse of the regenerated optical signal being reduced in size by the effect of subtraction of the 6 dB attenuated preceding pulse.

The generator 12 of FIG. 1 may be arranged to provide the generator input signal in the form of sampling pulses, thereby allowing the interferometer output 22 to be in form of sampled pulses which are sampled from a filtered version of the optical signal 16. This may alternatively be viewed as obtaining an output signal which is a convolution of the filtered optical signal and the sampling pulses. The generator 12 may alternatively be a source of continuous wave radiation, in which case the resulting output corresponds to a full waveform representative of the filtered version of the optical signal 16. The output 22 will in either case be at the wavelength determined by the generator so that the above described arrangement may also function as a wavelength converter.

The variation in output signal 22 is in general a cosine function with respect to variation in optical signal 16, this being an inherent property of the interferometer arrangement, so that if a linear response is required, the amplitude range of the waveform of the optical signal 16 should be set to be appropriately small in order to obtain an approximately linear response.

Automatic level control (not shown) is applied to optical signals input to the above and subsequently described apparatus.

Use of the generator 12 in conjunction with a clock recovery system to obtain output as sampled pulses allows the above arrangement to function as a regenerator.

The underlying principle used in the arrangement of FIG. 1 may be adapted in a variety of ways to other situations, a further example now being described with reference to FIG. 2 using correspondence reference numbers where appropriate for corresponding elements.

Figure 2:
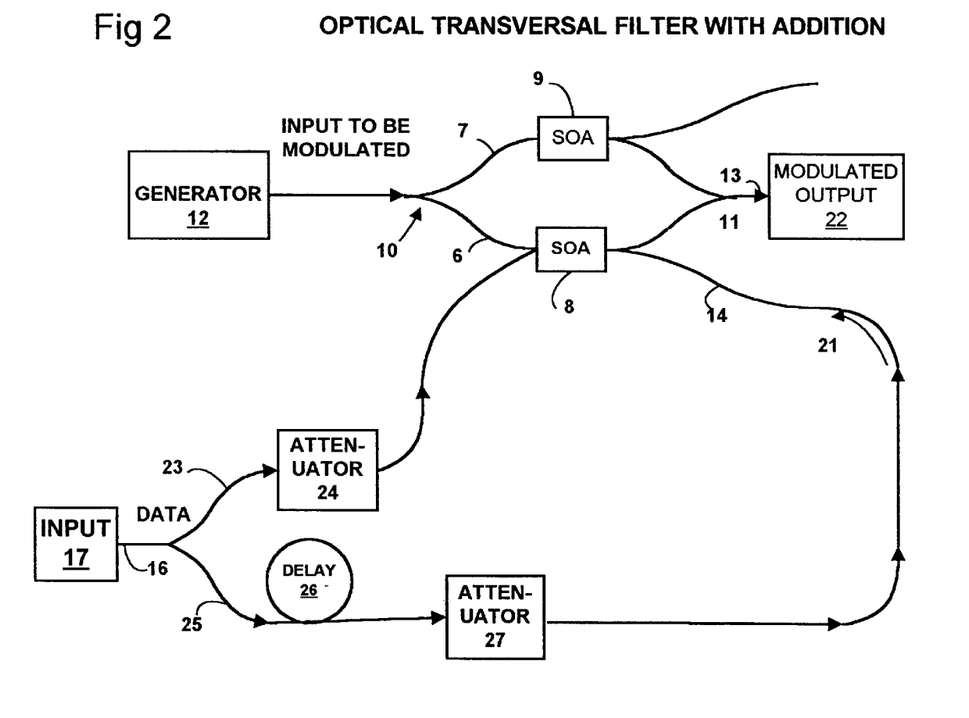
FIG. 2 is a schematic diagram of an optical transversal filter having two taps in which each of the taps has a positive weight.

FIG. 2 illustrates an optical transversal filter with two taps, each of which is assigned a positive weight. In FIG. 2, an interferometer 5 receives sampling optical pulses from an optical generator 12 which pulses are divided to propagate through the first and second arms 6 and 7 of the interferometer and are recombined at the waveguide combiner 11 to provide sampled pulses at an output 22. The amplitude of the sampled pulses at the output 22 is determined according to an interference condition in the interferometer 5 which is varied in dependence upon cross-modulation occurring in the first semiconductor optical amplifier 8.

An optical signal 16 from an input 17 from a telecommunications network is coupled into a first tap waveguide 23 including an attenuator 24 and a second tap waveguide 25 including both a delay device 26 and an attenuator 27. The first tap waveguide 23 is connected to the first arm 6 such that a first component 20 of the optical signal 16 forms a first tap signal which is co-propagated in the first semiconductor optical amplifier 8 relative to the sampling optical pulses. The second tap waveguide 25 is connected to the first arm 6 such that a second component 21 of the optical signal 16 forms a second tap signal which is counter-propagated in the first semiconductor optical amplifier 8 relative to the sampling pulses. Since the first and second components 20 and 21 of the optical signal 16 are propagated in mutually opposite directions, these components cannot add coherently. It is possible that, to the degree that the delayed second component 21 is correlated to the first component 21, a standing wave may be created in the first semiconductor optical amplifier 8 in which case any undesirable side effects may be removed by the addition of a polarisation rotator which may, for example, be included in the delay device 26.

The variations on the interference condition effected by the first and second tap signals are additive so that the attenuators 24 and 27 are seen as equivalent to determining positive weights for first and second taps of the transversal filter, corresponding to weights 3 and 3a in FIG. 6, whereas the delay device 26 corresponds to the delay 2a in FIG. 6 for a transversal filter in which there are only two taps.

Such a two tap transversal filter with positive weights may be configured to provide a low pass cosine filter with a bandwidth determined by the delay introduced by the delay device 26. This delay will generally be less than the bit period of the optical signal 16.

The output 22 of the interferometer 5 in FIG. 2 will contain pulses of the first component 20 of the optical signal 16 and, if necessary, these may be removed by a wavelength division multiplexing filter, assuming that the output of the optical pulse generator 12 has a different wavelength from that of the optical signal.

The generator 12 in FIG. 2 may alternatively be arranged to provide a continuous wave input to be modulated by the interferometer 5.

The configuration shown in FIG. 2 may be varied by, for example, arranging two semiconductor optical amplifiers in series within the first arm and separately feeding the first and second components 20 and 21 into the respective semiconductor optical amplifiers.

Figure 3:
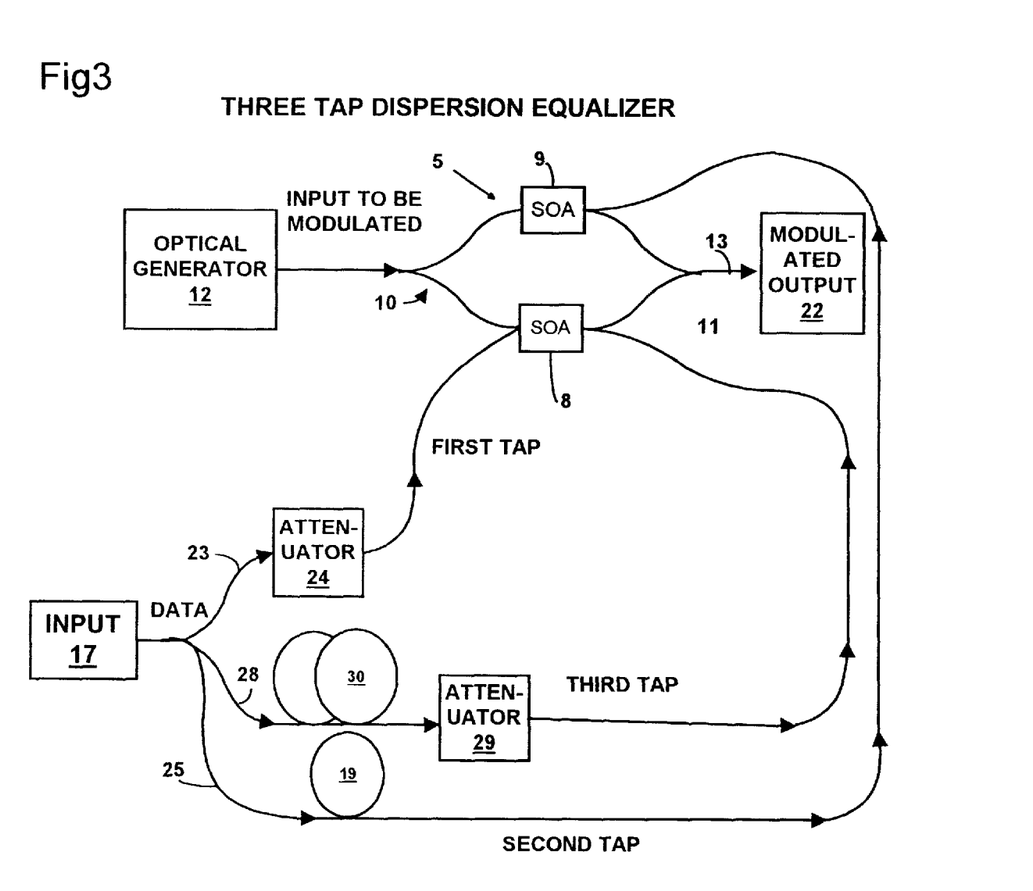
FIG. 3 is a schematic diagram of an optical transversal filter having three taps of which the first and third taps have negative weights.

A further transversal filter will now be described with reference to FIG. 3 using corresponding references to previous Figures where appropriate for corresponding elements. In FIG. 3, an interferometer 5 is similarly constructed to receive an optical input signal from a generator 12 which is coupled into both first and second arms 6 and 7 and recombined to provide an output 22 which is dependent upon an interference condition in the interferometer varied in accordance with cross-modulation occurring in first and second semiconductor optical amplifiers 8 and 9.

An optical signal 16 from an input 17 connected to a network is coupled into a first tap waveguide 23 including an attenuator 24, a second tap waveguide 25 including a first delay device 19, and a third tap waveguide 28 including both a second attenuator 29 and a second delay device 30. The second delay device 30 is arranged to provide a delay which is twice that provided by the first delay device 19.

The first tap waveguide 23 is coupled into the first arm 6 of the interferometer 5 so as to co-propagate a first tap signal with the sampling pulses through the first semiconductor optical amplifier 8. The second tap waveguide 25 is coupled into the second arm 7 so as to counterpropagate a second tap signal relative to the sampling pulses in the second semiconductor optical amplifier 9. The third tap waveguide 28 is coupled into the first arm 6 so as to counterpropagate a third tap signal relative to the sampling pulses in the first semiconductor optical amplifier 8.

Of the first, second and third tap signals propagating via the first, second and third tap waveguides 23, 25 and 28 respectively, the second tap signal has the greatest magnitude since the second tap waveguide does not include an attenuator, the second tap waveguide therefore corresponding to a tap of unit weight. Since both the first and third tap signals are also propagated in a different arm of the interferometer from the arm in which the second tap signal propagates, they have an opposing effect relative to the effect of the second tap signal on the interference condition and are therefore equivalent to having negative weights. The values of the attenuation provided by the first and third attenuators 28 and 29 are selected to provide therefore a small negative weight in each instance, and in this example have equal weights of 0.1.

The arrangement of FIG. 3 therefore corresponds to a transversal filter of FIG. 6 in which there are three taps, delays 2a and 2b corresponding to the first and second delay devices 19 and 30 and the weights 3 and 3b corresponding to the attenuators 24 and 29 respectively.

The transversal filter provided by the arrangement of FIG. 3 has particular application to optical equalisation of the effects of dispersion. It is known to provide electrical equalisation of the effects of fibre dispersion; see for example Cartledge et al, Journal of Lightwave Technology, August 1992, pp1105–1109. Equalisation in the electrical domain can however increase the noise density at high frequencies and can be difficult to effect at very high bit rates. There are applications, such as within optical regenerators, where the signal preferably remains in the optical domain so that the known use of electrical equalisation cannot conveniently be applied. Since the required form of transversal filter for use in regenerators requires the use of negative weights, optical transverse filters for this application have hitherto not been available.

Dispersion compensating fiber and dispersion compensating filters are known methods of mitigating the total fiber dispersion in an optical link, these filters including fiber grating filters and etalons. Such elements, however, generally have a fixed amount of compensation and the devices required need to be selected to match the particular optical link. Where etalons are used, they are generally actively tuned to the particular wavelength of data transmission.

It is known from U.S. Pat. No. 5,473,457 to provide a method of compensating for polarisation mode dispersion by applying a fixed compensation. In practice, however, the amount of polarisation mode dispersion present on an optical link varies widely with a Maxwellian distribution and so cannot be compensated satisfactorily by a fixed compensation method.

The present invention provides a means of mitigating the effects of such dispersion by applying equalisation to the waveform of the optical signal. This is distinct from the use of a compensation method to reverse the underlying optical effect.

As described above with reference to FIG. 3, the small negative weights of the first and third taps serve to subtract from both the leading and trailing tail portions of a waveform corresponding to the data pulse. It is thereby possible to mitigate or cancel the increases in amplitudes of the tail portions caused by dispersion. The values of the delays are advantageously selected to be multiples of the bit period in order to directly equalise the intersymbol interference. In the present example, the first and second delay devices 19 and 30 provide delays of 1 and 2 bit periods respectively. The output waveform appearing at the output 22 in response to a single pulse of the optical signal will, in the case of a continuous wave input from generator 12, correspond to the result of taking the pulse delayed by one bit period, subtracting $\frac{1}{10}$th of the optical signal waveform to reduce the leading tail portion of the delayed pulse, and subtracting $\frac{1}{10}$th of the optical signal delayed by two bit periods to reduce the trailing tail portion of the delayed pulse. The effects of dispersion on the shape of the pulse may thereby be mitigated by trimming the pulse tails.

Figure 7:
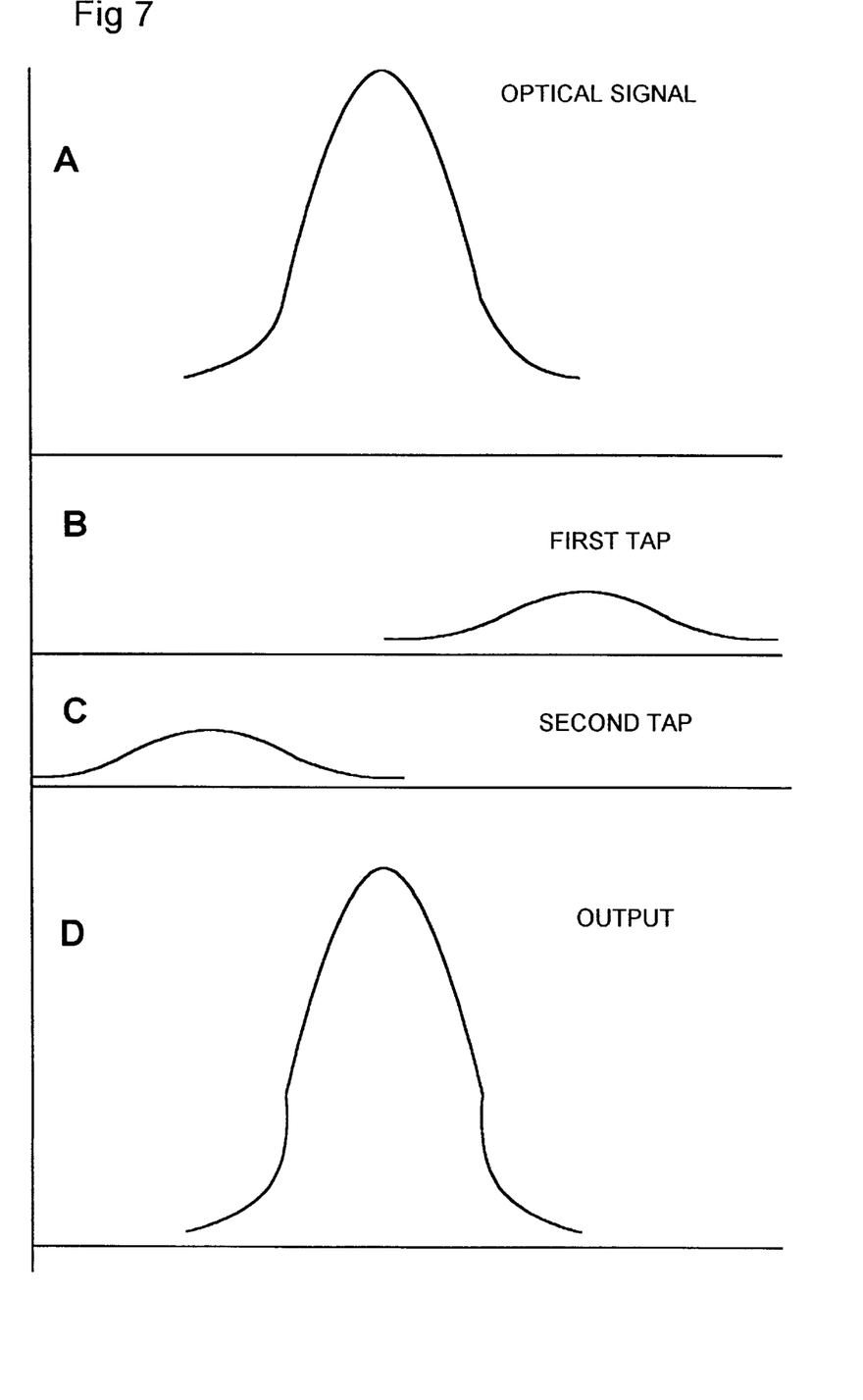
FIG. 7 is a schematic representation of tap signal waveforms in the embodiment of FIG. 3.

The above subtraction process is illustrated schematically in FIG. 7 in which waveform A represents the dispersed optical signal. Waveforms B and C represent the first and second tap waveforms and waveform D represents the output waveform.

It is envisaged in accordance with the present invention that further taps may be added, following the schematic of FIG. 6 to achieve more complex transversal filters including various combinations of weights which may be positive or negative as required.

The attenuation provided by the above attenuators, for example the attenuators 24 and 29 in FIG. 3, may be actively controlled to provide an adaptive equalizer. A feedback signal for controlling the weights of the transversal filter may be derived from parameters representative of the quality of the optical signal derived from eye measurement data or by any form of appropriate detector. This has particular advantage in the equalisation of the effects of polarisation mode dispersion where the required equalisation will vary gradually over time.

The arrangement of FIG. 3 may similarly be used to provide equalisation to mitigate the effects of self-phase modulation. The use of small negative weights for the first and third taps serves to subtract part of the leading and trailing tails of a data bit waveform in which spreading has occurred as a result of the effects of self-phase modulation. The delay periods are advantageously fractions of the bit period so as to open the timing window within the eye pattern of the resulting optical signal. Similarly, the transversal filter used for this purpose may be extended to include a greater number of taps. Advantageously, the tap weights and delays may be optimised by feedback control from measurement on the resulting optical signal such as, for example, by the use of parameters representing the quality of the optical signal derived from eye measurement data.

The optical tap waveforms may alternatively be processed by means of optical logic devices having outputs set to one of two possible states (binary 1 and 0). This has the advantage of reducing noise and avoiding accumulated noise effects in the combining process. In FIG. 3 for example, the elements 24 and 29 may additionally include optical latching devices based on further Mach-Zehnder interferometers. Optical latching devices based on Mach-Zehnder interferometers are disclosed in a co-pending U.S. Patent Application filed Jun. 5th 1997 and entitled "Optical detection and Logic Devices with Latching Function", the contents of which are incorporated herein by reference. Such devices comprise interferometers in which a portion of the interferometer output is fed-back into one of the arms of the interferometer to drive the interference condition into one of two possible states, thereafter remaining latched until reset into the other state.

The arrangement of FIG. 1 may be utilized in the compensation of cross-phase modulation occurring in a system for processing optical signals. Cross-phase modulation typically has a high pass linear characteristic with a pole at about 30 GHz for data with a bit rate of 10 Gbits/sec.

Compensation for this effect may be carried out by subtracting from the optical signal a suitably filtered version of the signal from which the unwanted modulation originated, this signal being referred to hereafter as the interfering signal. In some circumstances, it may be possible to effect such compensation in the electrical domain but situations are known to arise in which such electrical compensation is not feasible. If, for example, the interfering signal in the electrical domain is electrically coupled onto the same circuit board as used for processing the data signal in a transmission product, difficulties arise at high bit rates in preventing undesired electrical cross talk. In many situations, the electrical signal may only be present in equipment which is remotely located relative to the circuit board in which compensation is to be effected, thereby making electrical compensation impossible.

Figure 4:
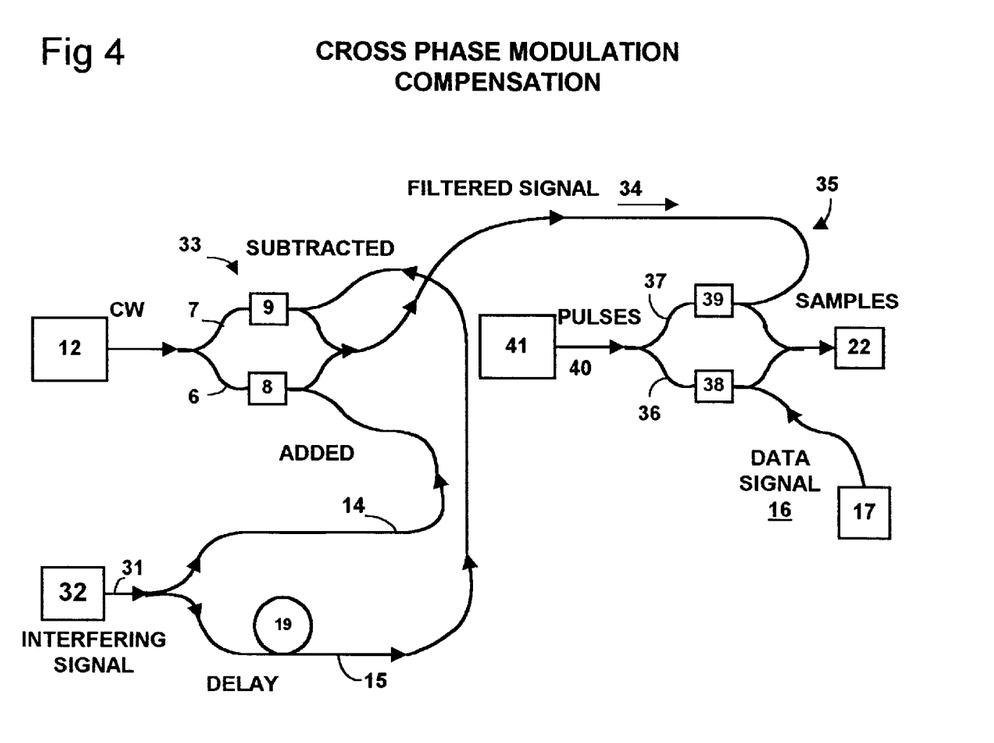
FIG. 4 is a schematic diagram of a transversal filter acting on an interference signal in combination with an optical sampler effecting subtraction of the filtered interference signal from a data carrying optical signal.

The following described example assumes that the interfering signal is available in the form of an optical signal. As shown in FIG. 4, the interfering signal 31 is input from a source 32 to a transversal filter 33 having two taps, formed by first and second tap waveguides 14 and 15 respectively which are input to the first and second arms 6 and 7 of the interferometer 5. The effects of first and second tap signals formed by first and second components of the interfering signal 31 in the first and second semiconductor optical amplifiers 8 and 9 respectively, have opposite effects on the interference condition set in the interferometer 5. The second tap waveguide 15 includes a delay device 19. This arrangement therefore defines the transversal filter 33 as having two taps, the first tap having unit weight and the second tap having a negative unit weight.

The resulting filtered signal 34 obtained by inputting a continuous wave signal to the interferometer 5 from a generator 12 is output to a further interferometer 35 of similar configuration to the first interferometer 5, the filtered signal 34 being input in a manner which effects subtraction of the filtered signal from the data carrying optical signal 16. The further interferometer 35 comprises a Mach-Zehnder configuration consisting of first and second arms 36 and 37, respectively including first and second semiconductor optical amplifiers 38 and 39. An input 17 connected to a network provides the data carrying optical signal 16 which is coupled into the first arm 36 so as to be counterpropagated in the first semiconductor optical amplifier 38 relative to sampling pulses 40 which are input to the first and second arms from an optical pulse generator 41. An output 22 of the further interferometer 35 consists of sampled pulses modulated in accordance with the data carrying optical signal 16, thereby constituting a regenerated version of the optical signal.

The filtered signal 34 is input to the second arm 37 to be counterpropagated relative to the sampling pulses 40 in the second semiconductor optical amplifier 39, thereby varying the interference condition of the interferometer 35 so as to oppose the effect of the optical signal, ie. thereby subtracting the filtered interfering signal 34 from the optical signal as sampled in the output sampled pulses.

Compensation of cross-phase modulation originating from the interfering signal may thereby be effected.

Figure 5:
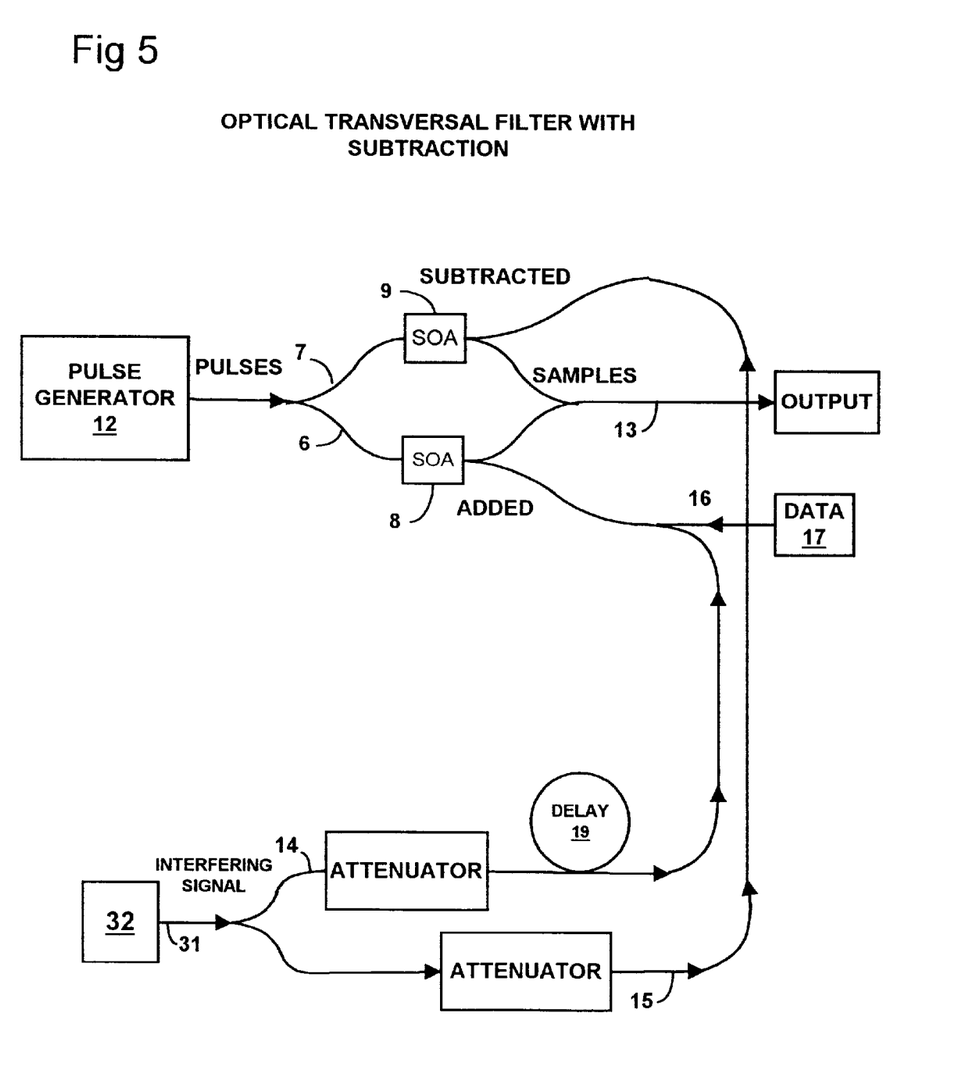
FIG. 5 is a schematic diagram of an optical transversal filter equivalent to the arrangement of FIG. 4.

The arrangement of FIG. 4 may be alternatively configured, with equivalent effect, using the arrangement shown in FIG. 5.

In the above example, only one interfering signal channel has been represented for simplicity. In practice, several interfering channels can be delayed, attenuated, combined, and fed in to the apparatus at source 32 of the interfering signal 31. The data signal 16 and the interfering signals 31 are delayed relative to each other to partially counter the delays due to chromatic dispersion. The tap signals formed by the interfering signals 31 are attenuated relative to each other and the data in order to adjust the level of compensation. The differential delay and differential attenuation determine the high pass filtering effect of the modulation by the interferometer. These parameters can be adaptively optimised by a feedback control mechanism using, for example, parameters extracted from eye measurement data on the resulting optical signal.

The above compensation method may also be utilised in subtracting linear cross talk, such as from imperfect wavelength division demultiplex filtering, in which case no modulation filtering is required.

The transversal filter of FIG. 2 may be utilised with a delay device 26 arranged to provide a delay corresponding to one bit period so that the transversal filter provides a logic function in which the value represented by the optical signal in a given pulse is additively combined with the value represented by the previous pulse. Such a logic function has application to regeneration of optical signals in which duobinary encoding is utilised, the logic function being used to constitute a partial response filter in the optical domain.

Duobinary transmission in the optical domain is envisaged in the form of phase duobinary encoding in which successive pulses have equal amplitude but alternating phase.

Such phase reversal may be achieved using a Mach-Zehnder interferometer of the type shown in FIG. 1 but in which the data signal 16 is input to counterpropagate only in the first arm 8, the first semiconductor optical amplifier in the first arm being biased to provide zero phase shift for 50% input power, +π phase shift for 100% input power and −π phase shift for zero input power. The output may thereby be arranged to provide pulses having alternating phase.

The transversal filter of FIG. 2 may be used to provide a logic function equivalent to a partial response filter used in conventional duobinary encoding. Such an arrangement may be configured to provide the input data stream required to generate output pulses of alternating phase, referred to above, thereby enabling logic functions to be performed in the optical domain which are conventionally performed in the electrical domain.

Digital compensation coding required to reverse the logical effect of the partial response filter may similarly be effected in the optical domain, providing a function equivalent to the preceding phase performed in the electrical domain. Such digital compensation coding may be effected using logic functions provided by interferometers of similar structure, arranged to have interference conditions determining outputs representative of logic states and, where appropriate, being provided with feedback signals to perform latching of the interference condition. Advantageously the digital compensation coding is performed in the electrical transmitter before multiplexing data at high bit rates. This digital compensation coding is preferably programmable so that the digital compensation coding compensates for the desired number of optical regenerators.

For duobinary partial response filtering, the digital compensation coding is to divide the binary bit stream by the polynomial 1+x, modulo 2. (x is a single bit delay in this nomenclature from the field of shift register sequence design). When n concatenated duobinary filters require compensation, the polynomial becomes (1+x) n. Applying modulo 2 to the coefficients of the result of this, the binomial distribution, zeros the even coefficients and makes the odd coefficients equal to one. For example, $(1+x)^2$ equals $1+x^2$ as the coefficient for x of 2 is even.

The serial shift register coding operation described here is advantageously converted to a parallel matrix operation in order to use lower speed digital elements. This conversion is a standard "book-keeping" procedure.

The duo-binary circuit can be used as a decoder, as an output driver, or as an optical gain stage.

The function of an analog partial response repeater can be implemented with electrical circuits or with opto-electronic circuits. For example, the concatenation of an electrical receiver, electrical amplifier, and an electrically driven Mach-Zehnder interferometer used as a modulator forms a well-known optoelectronic repeater. The signal remains analog as there is no clock recovery or retiming.

Inserting a partial response filter into the electrical amplifier of such a repeater, and arranging the Mach-Zehnder interferometer to be driven across 2π, converts this repeater to a partial response repeater. Digital compensation may then be conducted remotely, in the manner described above, for a series of such repeaters.

I claim:

1. A method of processing an optical signal having an intensity which is time varying in amplitude to define an optical signal waveform, the method comprising the steps of:

forming a plurality of optical tap signals from the optical signal such that the tap signals define respective tap signal waveforms representative of the optical signal waveform subjected to different respective delay periods;

inputting the tap signals as controlling signals to a modulating means such that the amplitude range of the controlling signals is sufficiently small for the modulation response of the modulating means to be approximately linear;

inputting an optical input signal to the modulating means to be modulated thereby;

and controlling the modulating mans in response to the input of the tap signals such that the modulating means provides modulation of the input signal to provide an optical output signal defining an output waveform modulated in dependence upon a substantially linear combination of the amplitudes of the tap signal waveforms.

2. A method as claimed in claim 1, wherein the modulating means provides modulation of the output waveform in dependence upon a substantially linear additive combination of the amplitudes of the tap signal waveforms.

3. A method as claimed in claim 1, wherein the modulating means provides modulation of the output signal in dependence upon a substantially linear combination of the amplitudes of the tap signal waveforms such that at least one of the tap signal waveforms is subtractively combined with the remaining tap signal waveforms.

4. A method as claimed in claim 1, including the step of applying respective weights to the tap signals such that the tap signal waveforms are representative of the optical signal waveform scaled by respective multiplication factors constituted by the weights.

5. A method as claimed in claim 4, wherein the step of applying weights comprises attenuating at least one of the tap signals by a respective attenuator.

6. A method as claimed in claim 1, wherein the input signal is a continuous wave signal.

7. A method as claimed in claim 1, wherein the input signal is a pulsed signal having a pulse length which is less than an optical signal pulse length defined by the optical signal whereby the output waveform is convolved with the pulsed signal waveform.

8. A method as claimed in claim 1, wherein the optical signal is pulsed and defines a bit period, wherein at least one of the delay periods of a respective optical signal is less than the bit period.

9. A method as claimed in claim 1, wherein the optical signal is pulsed to define a bit period, wherein at least one of the tap signals has a respective delay period substantially equal to one bit period.

10. A method as claimed in claim 9, wherein the at least one optical tap is processed by an optical logic element such that the optical tap waveform modulates between two levels representative of binary one and zero corresponding to respective binary values of the optical signal.

11. A method as claimed in claim 10, wherein the logic element comprises an optical latch element.

12. A method as claimed in claim 11, wherein the optical latch element comprises a Mach-Zehnder interferometer.

13. A method as claimed in claim 1, wherein the modulating means comprises an interferometer defining an interference condition whereby the output waveform is modulated in accordance with the interference condition, the interference condition being set in dependence upon the input of the tap signals.

14. A method as claimed in claim 13, wherein the interferometer comprises a Mach-Zehnder interferometer having first and second arms comprising first and second semiconductor optical amplifiers respectively, the method including the step of dividing the input signal into first and second components to be propagated through the first and second arms respectively and recombined in accordance with the interference condition to form the output signal, and propagating each of the tap signals through a respective single one of the semiconductor optical amplifiers so as to vary the interference condition by cross modulation of a respective component of the input signal.

15. A method as claimed in claim 14, including the step of additively combining the effects of a plurality of tap signal waveforms by inputting the respective tap signals to the same one of the semiconductor optical amplifiers.

16. A method as claimed in claim 15, wherein first and second tap signals are formed such that the first tap signal is delayed by a substantially zero delay period and the second tap signal is delayed by a non zero delay period less than the bit period of the optical signal, and wherein the first and second tap signals are counter-propagated relative to one another in the same one of the first semiconductor optical amplifiers.

17. A method as claimed in claim 14, wherein at least a first tap signal is input to the first semiconductor optical amplifier so as to vary the interference condition by cross modulation of the first component of the input signal and at least a second tap signal is input to the second semiconductor optical amplifier so as to vary the interference condition by cross modulation of the second component of the input signal whereby the combined effect on the interference condition is determined in accordance with a difference between the first and second tap signal waveforms, thereby subtractively combining the effects of the first and second tap signal waveforms.

18. A method as claimed in claim 17, wherein the plurality of optical tap signals comprises a first and a second tap signal to which mutually different weights are respectively applied, the first tap being delayed by a substantially zero delay period and the second tap signal being delayed by a non zero delay period less than a bit period of the optical signal.

19. An optical transversal filter for processing an optical signal having an intensity which is time varying in amplitude to define an optical signal waveform, the filter comprising;

a plurality of optical tap waveguides connected to receive the optical signal and comprising respective delay means operable to provide respective different delay periods whereby each optical tap waveguide is operable to output a respective tap signal having a tap signal waveform representative of the optical signal waveform subjected to the respective delay period;

a modulating means operable to receive an optical input signal and to output a Modulated output signal having an output waveform;

level control means operable to control the amplitude range of the tap signals to be sufficiently small for the modulation response of the modulating means to be approximately linear; and means for controlling the modulating means in response to the input of the tap signals such that the output waveform is modulated by the modulating means in dependence upon a substantially linear combination of the amplitudes of the tap signal waveforms.

20. A transversal filter as claimed in claim 19 wherein the modulating means is operable to provide modulation of the output waveform in dependence upon a substantially linear additive combination of the amplitudes of the tap signal waveforms.

21. A transversal filter as claimed in claim 19 wherein the modulating means is operable to provide modulation of the output signal in dependence upon a substantially linear combination of the amplitudes of the tap signal waveforms such that at least one of the tap signal waveforms is subtractively combined with the remaining tap signal waveforms.

22. A transversal filter as claimed in claim 19 wherein the optical tap waveguides comprise weighting means operable to apply respective weights to the tap signals such that the tap signal waveforms are representative of the optical signal waveform scaled by respective multiplication factors constituted by the weights.

23. A transversal filter as claimed in claim 22 wherein at least one of the optical tap waveguides comprises a weighting means constituted by an attenuator.

24. A transversal filter as claimed in claim 19 comprising an optical generator operable to provide the input signal in the form of a continuous wave signal.

25. A transversal filter as claimed in claim 19 comprising an optical generator operable to provide the input signal in the form of a pulsed signal having a pulse length which is less than an optical signal pulse length defined by the optical signal whereby the output waveform is convolved with the pulsed signal waveform.

26. A transversal filter as claimed in claim 19 wherein the optical signal is pulsed and defines a bit period, wherein at least one of the delay means is operable to provide a delay period less than the bit period.

27. A transversal filter as claimed in claim 19 wherein the optical signal is pulsed to define a bit period, and wherein at least one of the delay means is operable to provide a delay period substantially equal to one bit period.

28. A transversal filter as claimed in claim 27 wherein at least one of the optical tap waveguides comprises an optical logic element operable to modulate the optical tap waveform between two levels representative of binary 1 and 0 corresponding to respective binary values of the optical signal.

29. A transversal filter as claimed in claim 28 wherein the logic element comprises an optical latch element.

30. A transversal filter as claimed in claim 29 wherein the optical latch element comprises a further Mach-Zehnder interferometer having means for feeding back into one arm of the further interferometer a feedback portion of the optical tap waveform output from the further interferometer such that an interference condition of the further interferometer remains latched to provide one of the two levels of the optical tap waveform until reset.

31. A transversal filter as claimed in claim 19 wherein the modulation means comprises an interferometer operable to define an interference condition and to modulate the output waveform in accordance with the interference condition, and wherein the controlling means comprises means for setting the interference condition in dependence upon the input of the tap signals.

32. A transversal filter as claimed in claim 31 wherein the interferometer comprises a Mach-Zehnder interferometer having first and second arms comprising first and second semiconductor optical amplifiers respectively, the arms being connected to a waveguide splitter operable to divide the input signal into first and second components to be propagated through the first and second arms respectively and the arms being connected to a waveguide combiner operable to recombine the first and second components in accordance with the interference condition to form the output signal, and wherein each one of the optical tap waveguides is connected to a respective selected one of the semiconductor optical amplifiers such that each one of the tap signals is propagated through only a respective one of the semiconductor optical amplifiers to vary the interference condition by cross modulation of a respective component of the input signal.

33. A transversal filter as claimed in claim 32 wherein each of the optical tap waveguides is connected to the same one of the semiconductor optical amplifiers, thereby additively combining the effects of the plurality of tap signal waveforms.

34. A transversal filter as claimed in claim 33 wherein the plurality of optical tap waveguides is constituted by a first and a second optical tap waveguide, the first tap waveguide having a delay means providing a substantially zero delay period and the second optical tap waveguide having a delay means providing a non zero delay period less than the bit period of the optical signal, and wherein the first and second optical tap waveguides are connected to respective different inputs of the first semiconductor optical amplifier to provide counterpropagation relative to one another of the first and second tap signals in the first semiconductor optical amplifier.

35. A transversal filter as claimed in claim 32 wherein at least a first optical tap waveguide is connected to the first arm of the interferometer so as to input the first tap signal to the first semiconductor optical amplifier and at least a second optical tap waveguide is input to the second arm of the interferometer so as to input the second tap signal to the second semiconductor optical amplifier, whereby the combined effect on the interference condition is determined in accordance with a difference between the first and second tap signal waveforms, thereby subtractively combining the effects of the first and second tap signal waveforms.

36. A transversal filter as claimed in claim 35 wherein the plurality of optical tap waveguides is constituted by a first and a second optical tap waveguide having respective different weighting means, the first optical tap waveguide having a delay means providing a substantially zero delay period and the second optical tap waveguide having a delay means providing a non zero delay period less than a bit period of the optical signal.

37. A method of processing an optical signal having an intensity which is time varying in amplitude to define an optical signal waveform, the method comprising the steps of:

forming a plurality of optical tap signals from the optical signal such that the tap signals define respective tap signal waveforms representative of the optical signal waveform subjected to different respective delay periods;

inputting the tap signals as controlling signals to a modulating means;

inputting an optical input signal to the modulating means to be modulated thereby;

and controlling the modulating means in response to the input of the tap signals such that the modulating means provides modulation of the input signal to provide an optical output signal defining an output waveform modulated in dependence upon a combination of the amplitudes of the tap signal waveforms;

wherein the optical signal is pulsed to define a bit period, wherein at least one of the tap signals has a respective delay period substantially equal to one bit period; and wherein the at least one optical tap is processed by an optical logic element such that the optical tap waveform modulates between two levels representative of binary one and zero corresponding to respective binary valuer of the optical signal.

38. A method as claimed in claim 37, wherein the logic element comprises an optical latch element.

39. A method as claimed in claim 38, wherein the optical latch element comprises a Mach-Zehnder interferometer.

40. An optical transversal filter for processing an optical signal having an intensity which is time varying in amplitude to define an optical signal waveform, the filter comprising;

a plurality of optical tap waveguides connected to receive the optical signal and comprising respective delay means operable to provide respective different delay periods whereby each optical tap waveguide is operable to output a respective tap signal having a tap signal waveform representative of the optical signal waveform subjected to the respective delay period;

a modulating means operable to receive an optical input signal and to output a modulated output signal having an output waveform; and means for controlling the modulating means in response to the input of the tap signals such that the output waveform is modulated by the modulating means in dependence upon a combination of the amplitudes of the tap signal waveforms;

wherein the optical signal is pulsed to define a bit period, and wherein at least one of the delay means is operable to provide a delay period substantially equal to one bit period; and wherein at least one of the optical tap waveguides comprises an optical logic element operable to modulate the optical tap waveform between two levels representative of binary 1 and 0 corresponding to respective binary values of the optical signal.

41. A transversal filter as claimed in claim 40 wherein the logic element comprises an optical latch element.

42. A transversal filter as claimed in claim 41 wherein the optical latch element comprises a further Mach-Zehnder interferometer having means for feeding back into one arm of the further interferometer a feedback portion of the optical tap waveform output from the further interferometer such that an interference condition of the further interferometer remains latched to provide one of the two levels of the optical tap waveform until reset.

* * * * *